July 1, 1958 H. L. BEOHNER 2,841,550
PROCESS OF OPERATING A DEMINERALIZING INSTALLATION
Filed March 18, 1955
FIG.-1
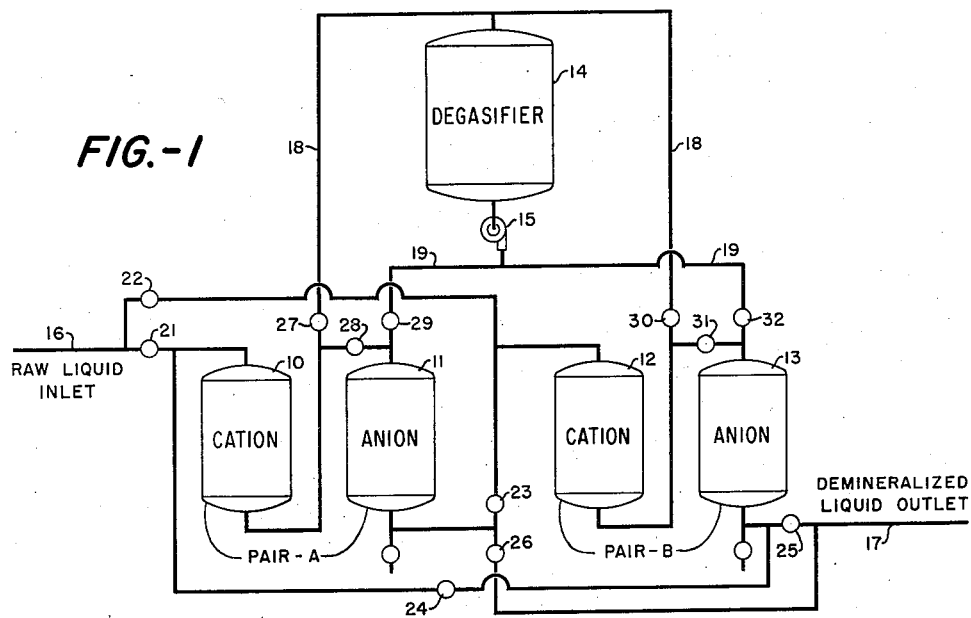
FIG.-2
| STEP | VALVE | | | | | | | | | | | |
|---|---|---|---|---|---|---|---|---|---|---|---|---|
| | 21 | 22 | 23 | 24 | 25 | 26 | 27 | 28 | 29 | 30 | 31 | 32 |
| a | O | X | O | X | O | X | O | X | O | X | O | X |
| b | O | O | X | X | O | X | X | O | X | O | X | O |
| c | O | X | O | X | O | X | O | X | O | X | O | X |
| d | X | O | X | O | X | O | X | O | X | O | X | O |
| e | O | O | X | X | X | O | O | X | O | X | O | X |
| f | X | O | X | O | X | O | X | O | X | O | X | O |
"O" SIGNIFIES VALVE IS OPEN.
"X" SIGNIFIES VALVE IS CLOSED.
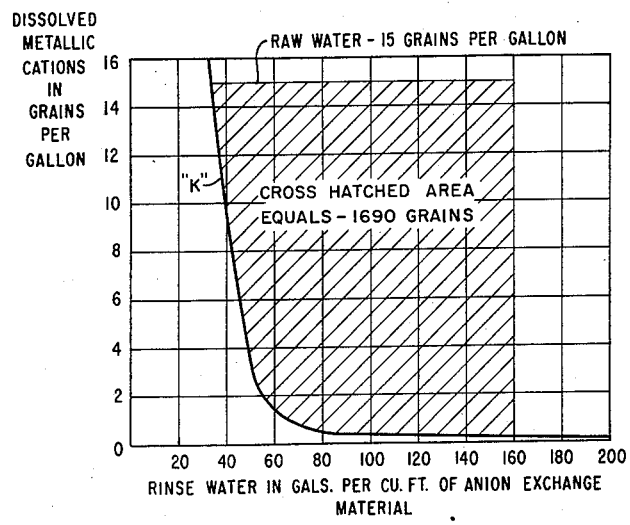
FIG.-3
HARRY L. BEOHNER
INVENTOR.
BY
ATTORNEY 2,841,550
Patented July 1, 1958

2,841,550
PROCESS OF OPERATING A DEMINERALIZING INSTALLATION

Harry L. Beohner, Wilton, Conn., assignor to Pfaudler Permutit Inc., New York, N. Y., a corporation of Delaware Application March 18, 1955, Serial No. 495,305

10 Claims. (Cl. 210—26)

This invention relates to a process of operating a demineralizing installation comprising at least two pairs of ion exchange units, each pair consisting of a cation exchange unit and an anion exchange unit, which process comprises carrying out with each of said pairs the following repeated cyclic sequence of steps: placing said pair as the first pair of a series, placing said pair as the second pair of a series, placing said pair again as the first pair of a series, and then reconditioning said pair, all as more fully set forth and as claimed hereinafter.

For the purpose of demineralizing water or other aqueous solutions of electrolytes, the use of ion exchange units has come into wide use. Such units are used in pairs, the first unit of each pair containing cation exchange material and the second unit containing anion exchange material. The cation exchange unit replaces the metallic cations by hydrogen ions and the second unit removes the anions. Silica can be removed by the anion exchange unit when a strongly basic anion exchange material is employed. Carbonic acid resulting from the passage through the cation exchange material of a raw liquid containing bicarbonates may be removed by the anion exchange unit together with the silica. As an alternative, such carbonic acid may be removed by degasifying the liquid coming from the cation exchange unit by the use of a degasifier, as disclosed in Pemberton et al. U. S. Patent 2,606,870. Such degasification reduces the size of the anion exchange unit as well as the quantity of regenerant required for such unit to treat a given volume of liquid.

While passage through a single pair of units reduces the dissolved electrolytes in an aqueous solution to a relatively low figure, the degree of purification obtainable by such single two-step treatment is not adequate for the exacting requirements of many modern industrial and commercial uses as, for instance, when treating water to be used for feeding boilers operating at very high pressures. In such cases, the demand for maximum removal of dissolved matter has been met by passing the liquid through two pairs of cation and anion exchange units in series. In this connection it has been customary practice to alternate the position of the two pairs of units every time one pair of units has been regenerated, placing the freshly-regenerated pair as the second pair in the series.

In regenerating the ion exchange units, the cation exchange unit is treated with a dilute solution of sulfuric or hydrochloric acid and the anion exchange unit is treated with a solution of a strong alkali such as caustic soda. Subsequent to such treatment with acid and alkali, respectively, the units are rinsed with water to remove spent and excess regenerant. Before a pair of units can be put back into service after regeneration as the second pair of a series, it is desirable to rinse the anion exchange unit very thoroughly until the rinse effluent has reached a degree of purification adequate to meet the exacting requirements for treated liquid flowing to service. Even though large quantities of rinse water are employed, as much as 160 gallons per cubic foot of anion exchange material and even more, such desirable high degree of purity is not quite obtained.

In installations employing two pairs of ion exchange units operating in series it has often been the practice to let one pair carry the load while the other pair is being regenerated. This is done for reasons of economy in order to avoid the additional cost of providing storage or a third pair, although such practice results in the supply to use of liquid not quite as completely demineralized during the outage time of one pair of reconditioning.

The objects of this invention are to provide a method of operating a demineralizing installation comprising two or more pairs of ion exchange units which:

(1) provides treated liquid of improved average purity;

(2) is capable of providing at all times an effluent having a silica content substantially as low as the lowest obtainable;

(3) increases the capacity of a given installation;

(4) reduces the quantity of ion exchange materials required for a given job and thus the first cost of the installation;

(5) reduces the quantities of regenerant required;

(6) reduces the quantity of water required for reconditioning; and (7) reduces the outage time for purposes of reconditioning.

The manner in which these objects are achieved will appear from the following specification and the appended drawing in which:

Fig. 1 is a diagrammatic showing of an installation adapted for the use of my novel process;

Fig. 2 is a tabulation of valve positions for the apparatus of Fig. 1 in order to carry out a sequence of steps in accordance with my invention; and Fig. 3 is a graph illustrating the saving in capacity obtainable by the use of my process.

My invention is based on the discovery that if a freshly-reconditioned pair of units is placed back in service as the first pair of a series instead of as the second pair, as has heretofore been customary, it is not necessary to rinse the anion exchange unit of such reconditioned pair very thoroughly, since any ions discharged by such pair will then be taken out by the second pair in the series. According to my invention the reconditioned pair remains the first pair in the series for some time whereupon the position of the two pairs in the series is reversed. Such procedure results in the achievement of all the objects enumerated above, as will be explained in greater detail.

Referring now to Fig. 1, there are shown two pairs of ion exchange units. Pair A consists of a cation exchange unit 10 and an anion exchange unit 11, and pair B consists of a cation exchange unit 12 and an anion exchange unit 13. There is provided a degasifier 14 with a pump 15. The raw liquid to be treated enters into inlet 16 and the demineralized liquid leaves at service outlet 17. Valves 21 to 32 inclusive are provided.

It should be noted that an installation such as that shown in Fig. 1 would include connections, valves and tanks, etc., for reconditioning each ion exchange unit. Such additional equipment for reconditioning has not been illustrated in Fig. 1 so as not to unnecessarily complicate the diagrammatic showing. It is to be understood, however, that conventional reconditioning appurtenances are provided.

Fig. 2 is a tabulation of the valve operations required in order to provide a cyclic sequence of six steps in accordance with my invention. In step (a) the liquid being treated is passed in series through pair A and pair B. In step (b) pair A is being reconditioned while liquid passes to the outlet 17 through pair B only. In step (c)

the reconditioned pair A has been returned as the first pair of the series, the flow consequently being the same as in step (a). In step (d) the position of the two pairs of units in the series has been reversed. The liquid now flows first through pair B, then through pair A and thence to outlet 17. In step (e) pair B is being reconditioned while liquid is being treated in pair A and discharged to outlet 17. In step (f) pair B has been returned to service as the first pair of the series, the flow path in step (f) being the same as in step (d). In next going again to step (a) the position of the two pairs in the series is once more reversed.

It will be noted that the liquid being treated is passed through the degasifier 14 after leaving the cation exchange unit 10 and before entering the anion exchange unit 11 in steps (a), (c) and (e), whereas it is passed through the degasifier 14 after leaving cation exchange unit 12 and before entering anion exchange unit 13 in steps (b), (d) and (f).

The use of a degasifier is not essential to my invention. If desired, the degasifier 14, the pump 15, the degasifier inlet connections 18, the degasifier outlet connections 19 and valves 27 to 32 inclusive may be omitted. In that event, any carbonic acid produced by passage through a cation exchange unit will be removed on passage of the liquid through a following anion exchange unit, which means that a larger anion exchange unit is required. In the event that it is desired to operate without using an available degasifier, valves 28 and 31 remain permanently open whereas valves 27, 29, 30 and 32 remain permanently closed. The positioning of valves 21 to 26 inclusive for providing a sequence of steps in accordance with my invention remains the same, however. It is customary to omit the degasifier in installations which either treat a solution containing relatively low amounts of bicarbonates or which are small in size so that it is more economical to avoid the rather high first cost of the degasifier at the expense of somewhat larger anion exchange units.

The process according to my invention will now be discussed in greater detail on the basis of a concrete example. Let it be assumed that a raw water is to be demineralized which contains 15 grains per gallon of metallic cations, 13 grains per gallon of chlorides and sulfates, 2 grains per gallon of bicarbonates, and 2 grains per gallon of silica, all expressed in terms of $CaCO_3$. Let it further be assumed that the cation exchange units 10 and 12 contain a styrene divinylbenzene type material having a capacity of 12,000 grains per cubic foot, and that the anion exchange units 11 and 13 contain a highly basic anion exchange material having a capacity of 12,000 grains per cubic foot. The curve "K" in Fig. 3 shows the concentration of dissolved metallic cations in the water flowing from the anion exchange unit during the later stages of rinsing; the concentration during the early stages of rinsing, much higher and of no particular significance in this discussion, has not been illustrated. The concentrations of sulfates and chlorides, and of silica in the rinse water follow a similar curve but lower than that for the metallic cations. In addition, such rinse water contains excess regenerant, usually NaOH, the concentration of which follows a curve similar to that for the metallic cations.

Step (a) is normally continued until pair A has been exhausted in its capacity, as usually determined by measuring the electric conductivity of the effluent from pair A. The reconditioning of pair A in step (b) is carried out in a conventional sequence of steps by first backwashing the cation exchange unit 10 with raw water, then introducing dilute acid to regenerate the cation exchange material and, finally, rinsing spent and excess acid from the unit 10 to waste. Next, the anion exchange unit 11 is reconditioned by first backwashing with water that has passed through the cation exchange unit 10, next introducing a solution of strong alkali for regenerating purposes and, finally, rinsing from the anion exchange material in unit 11 spent and excess regenerant by employing water that has passed through the cation exchange 10. Such rinse water is directed to waste. However, whereas in conventional operation in the past such rinsing of the anion exchange unit has been continued until the rinse effluent had a low enough dissolved solids content to be acceptable for service use, employing 160 gallons of rinse water per cubic foot of anion exchange material, step (b), in accordance with my invention, is terminated when the rinse effluent from unit 11 reaches a dissolved metallic cation content roughly equal to the metallic cation content of the raw water, i. e. 15 grains per gallon in this example. Such content is obtained after rinsing with approximately 35 gallons per cubic foot, as can be seen on curve "K" in Fig. 3.

Thus, by terminating the rinsing of the anion exchange unit 11 after employing for each cubic foot of anion exchange material but 35 gallons of rinse water instead of 160 such as customarily used previously, there is a saving in rinse water of 125 gallons. Further, since rinsing with these extra 125 gallons per cubic foot would consume about 60 more minutes, there is a corresponding saving in "outage time" when one pair of units (pair B) carries the entire load. Since a pair of units may be reconditioned in accordance with my invention in about 135 minutes where 60 minutes more, or 195 minutes, were formerly required, it is apparent that the outage time is reduced by more than 30 percent. In addition to these savings, however, there accrue additional advantages and benefits when the plant is now "prematurely" switched for a limited portion of its capacity according to my invention to step (c), an entirely novel procedure not heretofore known or used.

While pair B carries the load alone it discharges an effluent containing about 2 parts per million of dissolved solids, assuming it is at optimum exchange condition during the middle of the run. After rinsing with 160 gallons of rinse water per cubic fot of anion exchange material the rinse effluent contains about 3 parts per million of dissolved solids. Thus, by placing the reconditioned pair A second in the series in accordance with past practice, the service effluent is at first somewhat worse although it gradually improves, reaching a dissolved solids content of 0.2 to 0.5 part per million during the major part of the time while the two pairs are in series.

By placing the reconditioned pair A first in the series in accordance with my invention, on the other hand, the service effluent flowing from pair B instead of getting worse, actually gets better—and nearly 60 minutes earlier—and it gradually improves until it reaches the above mentioned low value of 0.2 to 0.5 part per million. It is clear, therefore, that the average dissolved solids content of the service effluent is substantially lower with my process.

When treating water to remove silica (usually together with other impurities) this advantage is even more pronounced. A single pair of units alone is capable, during the major middle portion of its run, of producing an effluent containing 0.02 to 0.05 part per million of silica. However, even after conventional long rinsing with 160 gallons per cubic foot the rinse water contanis 0.1 to 0.2 part per million of silica. Thus, by following the conventional method of placing a regenerated pair second in the series there results an immediate, although temporary, increase in the silica content of the treated water to about 5 times the lowest obtainable value. With my novel method, on the other hand, no increase in the silica content of the effluent to service occurs when the reconditioned pair is returned to service as the first pair because at that time the second pair is in the middle portion of its run. By the time the first pair is switched to become the second pair in the series it has progressed far enough into the middle portion of its run so that the silica content of its effluent has dropped to 0.02 to 0.05 part per million. Consequently, no appreciable increase in the silica content of the water delivered to use occurs at the time of switching over. Thus, an installation operated in accordance with my invention produces at all times an effluent to service having a silica content substantially as low as the lowest obtainable.

While pair B carries the load alone it receives raw water. When prematurely switching pair A into service as the first pair of the series, on the other hand, pair B receives water which has a dissolved solids content at first about equal to that of the raw water but decreasing rapidly. Thus, the cation exchange load on unit 12 is decreased by the cross hatched area in Fig. 3, namely 1690 grains per cubic foot, which is about 14 percent of the capacity of the cation exchange material. The saving in capacity for the anion exchange material in unit 13 is about the same. It should be noted that such earlier switching out of the rinse step has no effect on the capacity of pair A since it is immaterial to that pair whether its effluent is discharged to waste or used as influent for pair B.

The aforesaid saving in exchange capacity means that a given plant can produce a larger quantity of treated water in a given time. It also means that less ion exchange material (in this case about 14 percent less) is needed for a given job; and hand in hand with such reduced quantity of ion exchange material, of course, goes a corresponding reduction in the quantities of regenerants, both acid and alkali, which are required for such given job.

Pair A remains the first pair in the series for a period long enough to permit its effluent to drop to a low value corresponding to that obtained with conventional rinsing, or preferably somewhat lower. It may, however, also remain in this position for a considerably longer period of time provided such time is not prolonged to a point where pair A has insufficient capacity left to carry the load alone while pair B is being reconditioned and while it serves as the first pair in the series. When treating raw water of relatively low dissolved solids content, the point at which the position of pairs A and B is reversed in accordance with step (d) is within the range where from about 2 to 90 percent of the capacity of pair A has been exhausted. However, when treating water or other liquids of relatively high dissolved solids content the lower limit of such range will be raised and the upper limit of such range will be lowered.

A detailed discussion of steps (d), (e) and (f) appears unnecessary since these steps correspond to steps (a), (b) and (c), respectively, merely with the positions of pairs A and B reversed.

While in the example shown above the metallic cation content of the raw water equals its sulfate plus chloride plus silica content, resulting in equal capacity requirements for both cation and anion exchange units, this will not be so in most cases. Such variations in the proportions of the various ions contained by the liquid to be treated will somewhat affect the amounts of savings obtainable. It should, furthermore, be noted that the savings obtainable bear a direct relationship to the concentration of ions in the liquid to be treated: such savings will be lower than given in the above example when treating a liquid with lower dissolved solids content; on the other hand, the savings will be higher when treating a liquid with a higher dissolved solids content.

In the above example it has been assumed, for simplicity's sake, that step (b) is terminated and step (c) initiated when the dissolved metallic cations in the rinse effluent equal those in the raw water. Actually, in determining the most economical point at which to make such switch-over, it is necessary to consider the relative costs of the regenerants for the cation exchange material and for the anion exchange material. Further, consideration must be given to the fact that the anions in the last stages of rinse water flowing from the anion-exchange unit are the chlorides and sulfates originating in the raw water, plus the alkaline anions (carbonates and hydroxides) due to rinsing out the excess regenerant. If such rinse water is passed through another pair of units the chlorides and sulfates will be taken up by anion exchange and are thus chargeable with the cost of a certain quantity of regenerant; the alkaline anions on the other hand do not require the expenditure of regenerant because the carbonates will be converted by cation exchange to $CO_2$ which is essentialy removed in the degasifier whereas the removal of the metallic cations from the hydroxides in the cation exchange unit and their replacement by hydrogen converts the anion of the hydroxides to water. In view of the foregoing the most economical switch-over point will usually be at a stage in the rinse where the metallic cations are considerably higher than in the raw water while the chlorides and sulfates are lower than in the raw water. Actually, it is practically impossible in practice to make the switch-over at the exact desired point because the dissolved solids in the rinse water drop so rapidly in that range, as indicated by the steepness of the curve "K" in Fig. 3. In fact, it is not necessary to make the switch-over at the exact theoretically most advantageous point as the obtainable savings will be affected to but a minor degree when the dissolved ions in the rinse effluent are within the range of double to one-half the dissolved ions in the raw water which are to be exchanged, as can readily be ascertained by an inspection of Fig. 3.

If an installation is provided with storage for treated water and the demineralizing plant is large enough to provide the needed quantities of treated water by operating only at such times when both pairs of units are available for service, it will be found desirable to shut down the operation of pair B in step (b) by closing valve 23, and the operation of pair A in step (e) by closing valve 21. Thus, the flow of liquid to use through one pair of units while the other pair is being reconditioned is an optional feature required only when maximum use of the installed plant capacity is wanted. It is apparent that if a plant is operated in such manner that all water flowing to service is passed through two pairs of units in series the average dissolved solids content in such water flowing to service will be lower than otherwise.

In installations where a continuous supply to service of treated liquid having a minimum average dissolved solids content is required, three pairs of cation and anion exchange units are employed of which two are always operating in series while the third is being reconditioned or on stand-by. My invention may be applied to such installations, thereby achieving all the objects enumerated above, except that the saving in outage time is usually of no great advantage. Let it be assumed that an installation has three pairs of units, identified as A, B and C, each pair consisting of a cation exchange unit followed by an anion exchange unit. Operation of such an installation in accordance with my invention may be carried out in several different ways, two such ways being shown in the following table in which steps (a) to (i) inclusive constitute one method, and steps (k) to (s) inclusive constitute an alternative method:

| Step | First Pair in Series | Second Pair in Series | Pair being Reconditioned | Pair on Stand-by |
|------|----------------------|------------------------|--------------------------|------------------|
| a    | A | B | C |   |
| b    | C | B |   | A |
| c    | A | B |   | C |
| d    | B | C | A |   |
| e    | A | C |   | B |
| f    | B | C |   | A |
| g    | C | A | B |   |
| h    | B | A |   | C |
| i    | C | A |   | B |
| k    | A | B | C |   |
| l    | B | A | C |   |
| m    | B | A |   | C |
| n    | C | A | B |   |
| o    | A | C | B |   |
| p    | A | C |   | B |
| q    | B | C | A |   |
| r    | C | B | A |   |
| s    | C | B |   | A |

In some cases the duration of time a pair can remain in service to treat liquid before its capacity has been exhausted (i. e. the total of the times it is the first pair then the second pair and finally again the first pair in the series) equals double the length of time required for reconditioning a pair. In such cases a method comprising steps (k), (l), (n), (o), (q) and (r) can be employed. This is a modification of the method including steps (k) to (s), with steps (m), (p) and (s) omitted.

In any event, whether employing a two pair or a three or more pair installation, in practicing my invention a freshly reconditioned pair is placed in service as the first pair in the series for a limited period of time, then switched to second position in the series, and finally returned to first position in the series where it remains until its capacity has been exhausted. The switch from first position to second position is made when the pair has entered the middle portion of its run, its effluent then being of optimum quality. While a pair is in second position in a series very little capacity is consumed because it only serves to "polish up" liquid which has already passed through a pair of units to remove all but relatively small amounts of dissolved impurities. The switch back from second position to first position is thus likewise made while the pair is still in the middle portion of its run when its effluent is of optimum quaity, and before it approaches the end of the run to such a degree that the quality of the effluent begins to deteriorate.

While I have disclosed what I believe to be the best manner of practicing my invention, modifications other than those disclosed herein may be made without departing from its spirit and reference is therefore made to the appended claims for a definition of the scope of my invention.

What I claim is:

1. A process of operating a demineralizing installation comprising a plurality of pairs of ion exchange units adapted to be operated in series whereby liquid to be treated is passed through a maximum of two of said pairs in series, each of said pairs consisting of a cation exchange unit and an anion exchange unit, which process comprises carrying out with each of said plurality of pairs the following steps: (one) placing said pair as the first pair of a series until the capacity of said pair has been exhausted; (two) thereafter reconditioning said pair; (three) thereafter placing said pair again as the first pair of a series; (four) thereafter placing said pair as the second pair of a series; and thereafter repeating steps (one) to (four).

2. In the process of claim 1, terminating step (two) when the effluent of the said pair being reconditioned has a content of dissolved ions to be exchanged substantially equal to that of the liquid being treated.

3. In the process of claim 1, changing from step (three) to step (four) when between 2 percent and 90 percent of the capacity of said pair has been consumed.

4. In the process of claim 1, degasifying the liquid flowing from the cation exchange unit of said pair in steps (one) and (three).

5. A process of operating a demineralizing installation comprising two pairs of ion exchange units, each pair consisting of a cation exchange unit and an anion exchange unit, said pairs being identified as pair A and pair B, which process comprises the following steps: (a) flowing liquid to be treated first through pair A and then through pair B until the capacity of pair A has been exhausted; (b) reconditioning pair A; (c) flowing liquid to be treated first through pair A and then through pair B; (d) flowing liquid to be treated first through pair B and then through pair A until the capacity of pair B has been exhausted; (e) reconditioning pair B; (f) flowing liquid to be treated first through pair B and then through pair A, and repeating the sequence of steps (a) to (f).

6. In the process of claim 5, changing from step (b) to step (c) and from step (e) to step (f) when the effluent of the said pair being reconditioned has a content of dissolved ions to be exchanged substantially equal to that of the liquid being treated.

7. In the process of claim 5, changing from step (c) to step (d) and from step (f) to step (a) when between 2 percent and 90 percent of the capacity of pair A in step (c) and of pair B in step (f), respectively, has been consumed.

8. In the process of claim 5, degasifying the liquid flowing from the cation exchange unit of pair in steps (a) and (c) and degasifying the liquid flowing from the cation exchange unit of pair B in steps (d) and (f).

9. In the process of claim 5, flowing liquid to be treated through pair B in step (b) and through pair A in step (e).

10. In the process of claim 9, degasifying the liquid flowing from the cation exchange unit of pair A in steps (a), (c) and (e), and degasifying the liquid flowing from the cation exchange unit of pair B in steps (b), (d) and (f).

References Cited in the file of this patent

UNITED STATES PATENTS

| 2,422,821 | Bhoota  | June 24, 1947 |
| 2,458,115 | Swenson | Jan. 4, 1949  |
| 2,617,765 | Swarr   | Nov. 11, 1952 |